(12) United States Patent
Blake

(10) Patent No.: US 6,516,557 B2
(45) Date of Patent: Feb. 11, 2003

(54) CAMOUFLAGE LIZARD CATCHING DEVICE

(76) Inventor: Don Blake, 12555 n. 77th Ave., Peoria, AZ (US) 85381

( * ) Notice: Subject to any disclaimer, the term of this patent is extended or adjusted under 35 U.S.C. 154(b) by 0 days.

(21) Appl. No.: 09/978,283

(22) Filed: Oct. 17, 2001

(65) Prior Publication Data

US 2002/0046482 A1 Apr. 25, 2002

Related U.S. Application Data

(60) Provisional application No. 60/241,947, filed on Oct. 23, 2000.

(51) Int. Cl.$^7$ ............................................. A01M 23/24
(52) U.S. Cl. ........................................................ 43/87
(58) Field of Search ........................ 119/80, 802, 803; 43/18.1, 18.5, 19.2, 87

(56) References Cited

U.S. PATENT DOCUMENTS

| | | | | |
|---|---|---|---|---|
| 322,736 A | * | 7/1885 | Marshall | |
| 1,467,846 A | * | 9/1923 | Dugas | |
| 1,647,578 A | * | 11/1927 | Penn | |
| 2,179,394 A | * | 11/1939 | Wulff | 43/5 |
| 2,704,052 A | * | 3/1955 | Wood | 119/153 |
| 2,793,466 A | * | 5/1957 | Esposito | 43/87 |
| 3,765,119 A | * | 10/1973 | Hare et al. | 43/87 |
| 3,949,514 A | * | 4/1976 | Ramsey | 43/87 |
| 4,179,837 A | * | 12/1979 | Gummeringer | 43/87 |
| 4,751,790 A | * | 6/1988 | Thomas | 43/87 |
| 5,088,449 A | * | 2/1992 | Lamb, Sr. et al. | 119/153 |
| 5,340,120 A | * | 8/1994 | Holyoak | 273/447 |
| 5,460,373 A | | 10/1995 | McNutt | |
| 5,960,747 A | | 10/1999 | Heil | |
| 2002/0028718 A1 | * | 3/2002 | Coe | 473/586 |

* cited by examiner

Primary Examiner—Charles T. Jordan
Assistant Examiner—Bret Hayes
(74) Attorney, Agent, or Firm—Randal D. Homburg

(57) ABSTRACT

The invention is a looped lizard catching device having a camouflaged appearance to allow the device to have the appearance and texture of a weed or grass allowing the device to be hidden from view of the prospective catch while also including an attached lure to attract the reptile to the looped end of the device.

4 Claims, 2 Drawing Sheets

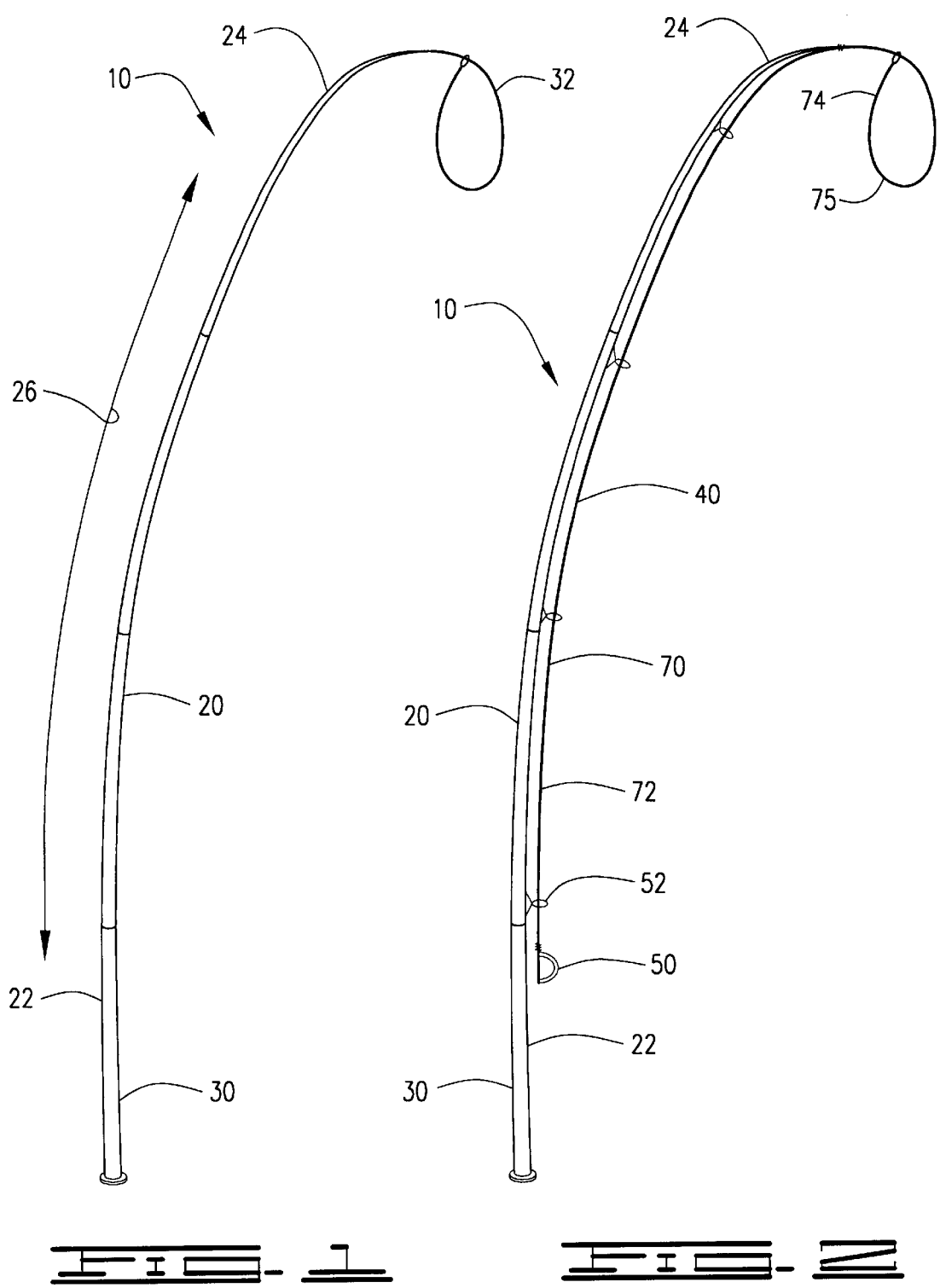

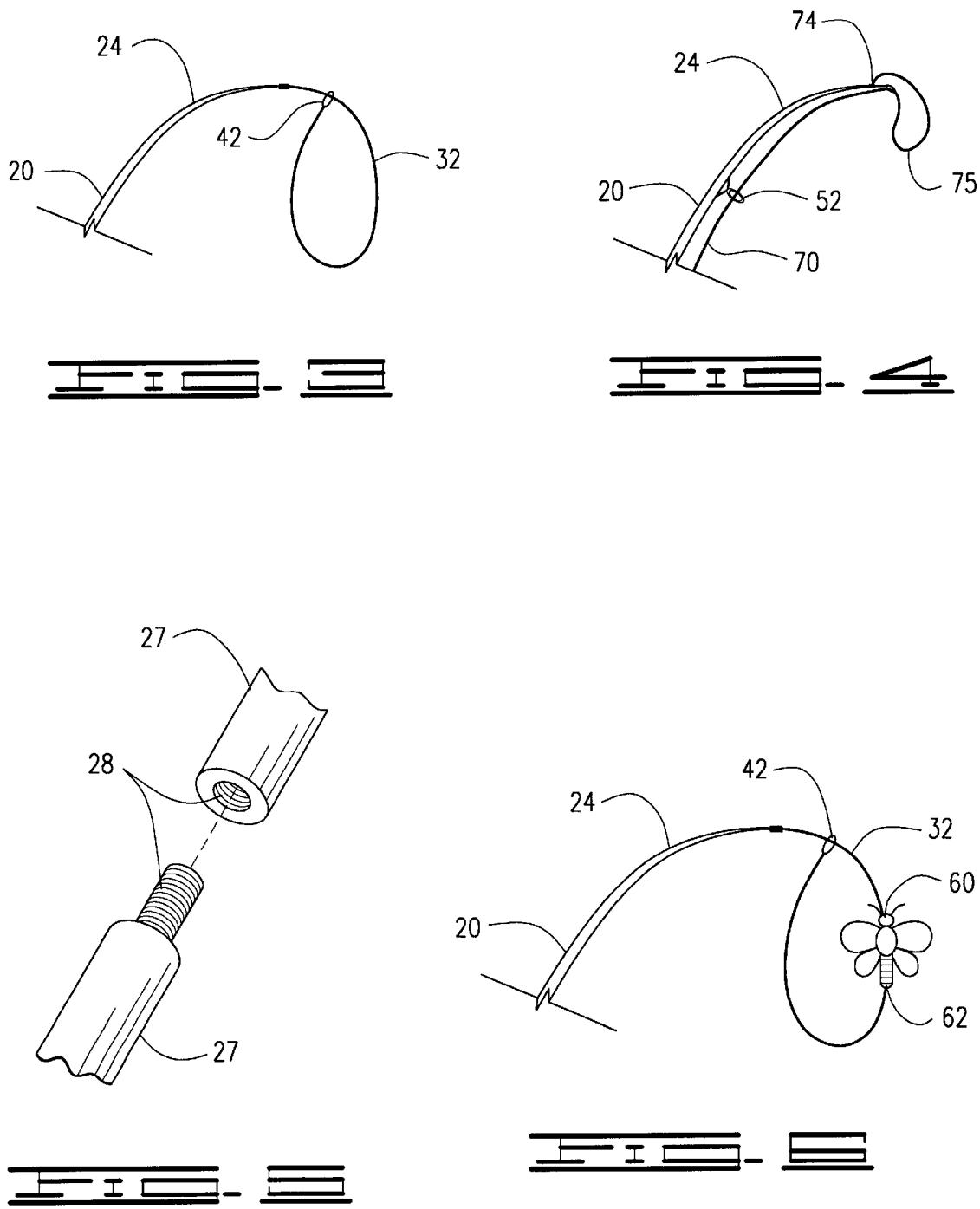

CAMOUFLAGE LIZARD CATCHING DEVICE

CROSS REFERENCE TO RELATED APPLICATIONS

Provisional Patent Application No. 60/241/947 filed Oct. 23, 2000.

BACKGROUND OF INVENTION

1. Field of the Invention

The invention is a humane looped lizard catching device having a camouflaged appearance and texture of a weed or grass allowing the device to be hidden from view of the prospective catch while also including an attached lure to attract the reptile to the looped end of the device.

2. Description of Prior Art

The following United States patents are identified, disclosed and incorporated herein. Several devices are disclosed relating to looped catching devices, including a snake snare disclosed in U.S. Pat. No. 3,949,514 to Ramsey, a calf catching device disclosed in U.S. Pat. No. 5,088,449 to Lamb, Sr., an animal catching device disclosed in U.S. Pat. No. 5,960,747 to Heil and an appendage grasper, disclosed in U.S. Pat. No. 5,460,373 to McNutt. None of these, however, include any camouflage component to make it indiscernible from the surroundings to the animal attempted to be captured by the devices, nor do they include any lure which would attract any reptile.

SUMMARY OF THE INVENTION

The objective of the invention is to provide a humane device for catching reptiles and lizards in the wild which is camouflaged and less visible to the creature being caught by giving the device the appearance of surrounding vegetation, grass or weeds. The device is also provided with a lure to attract the reptile to the looped end of the device to assist in catching the reptile.

DESCRIPTION OF THE DRAWINGS

The following drawings are submitted with this utility patent application.

FIG. 1 is a view of the first embodiment of the device.

FIG. 2 is a view of the second embodiment of the device.

FIG. 3 is a view of the distal end of the first embodiment of the device.

FIG. 4 is a view of the distal end of the second embodiment of the device.

FIG. 5 is a view the rod attachment of the rod segments.

FIG. 6 is a view of the lure attachment and a lure on the distal end of the device.

DESCRIPTION OF THE PREFERRED EMBODIMENT

The invention, as shown in FIGS. 1–6 of the drawings, is a humane device 10 for catching lizards and other small reptiles in grasses, weeds or other vegetation, the device 10 comprising essentially an elongated camouflaged shaft 20 having a length 26 and bearing the appearance, texture and color of vegetation, such camouflaged shaft 20 having a handle 30 on a proximal end 22 of the camouflaged shaft 20 and having a loop 32 on a distal end 24 of the camouflaged shaft 20, such loop having an attachment means 60 for a lure 62 to attract a reptile. The device 10 is held by the handle 30 and the loop 32 is placed around the creature to be caught, the camouflaged shaft 20 and loop 32 of the invention being less visible and detectible by the creature being ensnared than a device without the camouflage appearance of the present device 10.

The device 10 has a means 40 of reducing the loop 32 to tighten such loop 32 around the creature being caught. In a first embodiment, as shown in FIGS. 1, 3 and 6 of the drawings, this means 40 may be provided by having a small slip loop 42 attached to the camouflaged shaft 20 at the distal end 24. The slip loop 42 is placed around a part or an appendage of the reptile being caught and by pulling or lifting the distal end 24 of the camouflage shaft 20, the slip loop 42 is reduced to securely maintain hold of the creature being caught. Included on the slip loop 42 is the attachment means 60 securing a lure 62 to attract the reptile to the slip loop 42.

In a second embodiment, as shown in FIGS. 2, 4 and 6 of the drawings, the camouflaged shaft 20 includes a retractable trigger 50, a plurality of wire guides 52 along the length 26 and a strand of wire 70, the wire 70 having a first end 72 attached to the retractable trigger 50 and a second end 74 attaching to the distal end 24 of the camouflaged shaft 20, a portion of the wire forming a loop 75 at the second end 74. The wire 70 is run through the plurality of wire guides 52 along the length 26 of the camouflaged shaft 20. Included on the loop at the second end of the wire is the attachment means 60 securing a lure 62 to attract the reptile to the wire loop.

The camouflaged shaft 20 may be a singular solid piece or it may be comprised of a plurality of segments 27 connected by a shaft connection means 28, as shown in FIG. 5 of the drawings.

Although the embodiments of the invention have been described and shown above, it will be appreciated by those skilled in the art that numerous modifications may be made therein without departing from the scope of the invention as herein described.

I claim:

1. A humane device for catching lizards or other small reptiles in grasses, weeds or other vegetation, the device comprising:
   a. an elongated camouflaged shaft having a length, a distal end, and a handle on a proximal end;
   b. a loop on the distal end of the camouflaged shaft;
   c. a means of reducing the loop; and
   d. an attachment means on the loop to attach a lure to attract a lizard or other small reptile.

2. The device as disclosed in claim 1, wherein the means of reducing the loop is a slip loop on the distal end of the shaft which is reduced by pulling or lifting of the distal end of the camouflaged shaft after the slip loop is placed around a part or appendage of the reptile.

3. The device as disclosed in claim 1, wherein:
   the means of reducing the loop includes the camouflaged shaft having a retractable trigger, a plurality of wire guides along the length and a strand of wire run through the plurality of wire guides along the length of the camouflaged shaft, such wire having a first end attached to the retractable trigger and a second end attaching to the distal end of the camouflaged shaft, a portion of the wire forming the loop at the second end.

4. The device as disclosed in claim 1 wherein the camouflaged shaft includes a plurality of segments connected by a shaft connection means.

* * * * *